United States Patent [19]

McKay

[11] 3,770,476

[45] Nov. 6, 1973

[54] PROCESS FOR THE PRODUCTION OF FLOCCULATION RESISTANT PIGMENTS

[75] Inventor: Robert Bruce McKay, Kilmarnock, Scotland

[73] Assignee: Ciba-Geigy AG, Basel, Switzerland

[22] Filed: Feb. 9, 1972

[21] Appl. No.: 225,002

Related U.S. Application Data

[63] Continuation-in-part of Ser. No. 63,282, Aug. 12, 1970, abandoned.

[30] Foreign Application Priority Data

Aug. 13, 1969   Great Britain.................. 40,454/69

[52] U.S. Cl.............................. 106/309, 106/288 Q
[51] Int. Cl....................................................... C09b

[58] Field of Search............. 106/309, 288 Q, 308 N

[56] References Cited
UNITED STATES PATENTS

| | | | |
|---|---|---|---|
| 3,647,496 | 3/1972 | Bagai et al.......................... | 106/309 |
| 3,288,621 | 11/1966 | Barron et al........................ | 106/288 |

*Primary Examiner*—Delbert E. Gantz
*Assistant Examiner*—S. Berger
*Attorney*—E. F. Wenderoth et al.

[57] ABSTRACT

Flocculation resistant pigments are prepared by milling together a phthalocyanine pigment, a chloromethylated phthalocyanine compound and organic amines.

14 Claims, No Drawings

PROCESS FOR THE PRODUCTION OF FLOCCULATION RESISTANT PIGMENTS

This is a continuation, of application Ser. No. 63,282, filed August 12, 1970, now abandoned.

DETAILED DESCRIPTION

The present invention relates to a new process for the production of pigment compositions and in particular to a new process for the production of non-flocculating pigment compositions comprising phthalocyanine pigments.

Phthalocyanine pigments, especially copper phthalocyanine, by virtue of their low cost, high strength, brilliant shades and outstanding general fastness properties are of great commercial importance.

In paint and lacquer systems, however, these pigments in all their various forms suffer from a particular defect which is not shared by most other organic pigments. The defect in question manifests itself particularly in paints based on titanium dioxide or other white inorganic pigment and the phthalocyanine pigment, especially in non-aqueous systems. If such paints are applied under different conditions of shear, widely different strengths of shade are obtained. Similarly, when paints or printing inks containing phthalocyanine pigments are stored, the pigment particles tend to aggregate with resulting loss of tinctorial strength and homogeneity of the paint or ink.

Many attempts have been made to try and overcome this flocculation problem with varying degrees of success. Thus British Pat. No. 949,739 teaches that phthalocyanine pigment mixtures may be rendered resistant to flocculation by incorporating 0.5 to 10 mole per cent of a phthalocyanine methylene amine having the general formula:

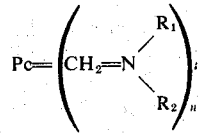

wherein Pc represents $n$ phthalocyanine radical, $R_1$ is hydrogen or an unsusbtituted or substituted aliphatic hydrocarbon radical, $R_2$ is an unsubstituted or substituted aliphatic hydrocarbon radical or, when taken together with $R_1$, a heterocyclic ring, and $n$ is a number from 1 to 4, preferably 3 or 4.

The production of these non-flocculating pigment mixtures by the technique of simple admixture of the components is recommended in British Pat. No. 949,739 to be effected preferably in the following two ways. Firstly, the phthalocyanine methylene amine may be acid pasted with phthalocyanine pigment mixtures tending to flocculate, with subsequent drowning out. Alternatively, the components may be mixed thoroughly by heating them together in an organic solvent. The latter method is stated to be especially advantageous when applied in conjunction with grinding in the presence of grinding agents such as inorganic salts.

Surprisingly, we have now found that by milling together in a single stage phthalocyanine pigment tending to flocculate, a chloromethylated phthalocyanine compound and certain organic amines, compositions in pigmentary form are produced having excellent flocculation-resistance combined with other desirable pigmentary properties. This new method, therefore, has the considerable advantage of producing the phthalocyanine methylene amine in situ, that is without having to produce this compound in a separate stage involving a heating procedure, thus saving considerable plant services and labour costs. Furthermore, we have found that the new single-stage process may be effectively operated at ambient temperatures, thus avoiding still further expensive heating costs and plant.

Accordingly, the present invention provides a single-stage process for the production of a flocculation-resistant pigment composition, which process comprises contacting and milling a phthalocyanine pigment having the tendency to flocculate with a minor proportion of a chloromethylated phthalocyanine pigment and an amine having the formula:

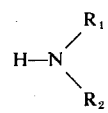

wherein $R_1$ represents hydrogen, an alkyl or hydroxyalkyl radical, $R_2$ represents an alkyl, hydroxyalkyl, alkoxyalkyl, aminoalkyl, cycloalkyl or aralkyl radical, or $R_1$ and $R_2$ together with the nitrogen atom to which they are bound represent a heterocyclic radical which optionally includes a further hetero atom, as ring member, especially oxygen or nitrogen.

Any phthalocyanine pigment having a tendency to flocculate may be employed as a starting-material in the process of the present invention. Thus the flocculating phthalocyanine may be unchlorinated or chlorinated, metal-free or metalliferous, the latter type containing such metals as nickel, cobalt or preferably copper. Of particular interest however, are copper phthalocyanine or its chlorinated derivatives especially copper phthalocyanines containing from 0 to 10 percent chlorine, for instance the mono-chloro copper phthalocyanine and metal-free phthalocyanine.

The chloromethylated phthalocyanine pigment may also be metal-free or metalliferous. However, chloromethylated copper phthalocyanines are of particular interest. The chloromethylated copper phthalocyanine should preferably contain a minimum of 5 percent by weight, based on the weight of the phthalocyanine residue, chlorine indirectly linked to the phthalocyanine nucleus through —$CH_2$— links. More preferably the proportion of such chlorine atoms is within the range of from 10 to 30 percent by weight based on the weight of the phthalocyanine residue.

The proportion of the chloromethylated phthalocyanine to that of the flocculating phthalocyanine employed in the process of the present invention may be, for instance, within the range of from 0.5 to 25 percent by weight, more preferably within the range of from 1 to 15 percent by weight, based on the weight of the flocculating phthalocyanine pigment.

The chloromethylated phthalocyanine compounds may be produced, for example, according to a procedure described in the British Pat. No. 586,340.

Preferred amines of formula I are those wherein $R_1$ is hydrogen and $R_2$ is an alkyl radical having e.g., 1 to 20 carbon atoms. Examples of such amines which are particularly suitable for use in the process of the present invention include methylamine, ethylamine, isopropylamine, n-butylamine, 2-ethylhexylamine, n-octylamine, n-decylamine, n-dodecylamine and cetylamine. Other preferred examples of primary amines of formula 1 are those wherein $R_1$ is hydrogen and $R_2$ is a cycloalkyl group, especially cyclohexylamine. Suitable secondary amines of formula 1 include those wherein $R_1$ and $R_2$ are each an alkyl radical having 1 to 6 carbon atoms, for example dimethylamine, diethylamine, di-n-butylamine and di-n-hexylamine. Other examples of amines of formula 1 are ethanolamine, 3-methoxy-propylamine, benzylamine, piperidine, pyrrolidine and morpholine.

Suitable amines of formula 1 having as $R_2$ aminoalkyl groups include, for instance, ethylene diamine, diethylene triamine, triethylene tetraamine and tetraethylene pentamine.

Liquid amines of formula I may be used either undiluted or diluted, although excessive dilution should be avoided because it decreases the flocculation-resistance of the final pigment composition. Any diluent is preferably an organic solvent and although in principle water or a mixture of water and an organic solvent can be tolerated in the liquid grinding process described below, the use of water is not desirable. Preferred solvents include for instance aliphatic alcohols or aliphatic ketones. Suitable aliphatic alcohols are, for example, methanol, ethanol, iso-propanol, n-butyl alcohol or amyl alcohol and suitable aliphatic ketones include acetone and methyl ethyl ketone. Tertiary bases such as pyridine and optionally halogenated or nitrated aromatic hydrocarbons such as benzene, trichlorobenzene or nitro-benzene may also be used as organic solvent.

The flocculating phthalocyanine pigment may be employed in the form produced in any of its various stages of manufacture, for instance in crude form, as filter cake or presscake, or especially as dry powder or as acid-pasted or salt-ground pigmentary material. However, for reasons of economy, it is particularly preferred to use the flocculating phthalocyanine in crude form.

The amine is advantageously employed in the single-stage grinds in considerable excess over the stoichiometric proportion required to fully react with the chloromethylated phthalocyanine, the excess amine being required to remove at source hydrogen chloride formed in the reaction between the amine and the chloromethylated phthalocyanine compound.

Any suitable milling method may be employed such as sand grinding, ball milling or Perl milling with the aid of corresponding grinding agents which include sand, gravel and glass beads.

Thus the production of a flocculation resistant pigment of the invention is conveniently effected by charging the flocculating phthalocyanine, the chloromethylated phthalocyanine, the amine and the grinding aid into a mill, and milling the mixture for a period, preferably within the range of from 5 to 100 hours, depending on the mill system used. The liquid milling is desirably effected in the presence of a diluting agent and at ambient temperature, that is at a temperature within the range of from 15° to 30° C, although higher temperatures can be used. Suitable diluting agents are those described hereinbefore as solvents suitable for use as diluents in conjunction with the amines of formula I.

Considerable economic advantages are enjoyed by the milling process of the present invention over known processes for the production of similar pigment compositions. Thus the process of the invention is carried out in a single-stage wherein the amine is reacted with the chloromethylated phthalocyanine and this reaction product is simultaneously incorporated into the flocculating phthalocyanine. In conventional processes, these operations are carried out in separate stages and it was not obvious that the combination of these operations into a single-step process would prove successful.

The pigment compositions produced according to the process of the present invention have high tinctorial power and exhibit excellent resistance to flocculation, for instance when incorporated into surface-coating compositions, such as medium to long oil alkyd paints, melamine-formaldehyde modified alkyd paint or acrylic paints.

The following Examples further illustrate the present invention. Parts and percentages are expressed by weight unless otherwise stated.

EXAMPLES 1 TO 10

18 parts by weight of dry crude monochloro copper phthalocyanine, 2 parts by weight of chloromethylated copper phthalocyanine (having a chlorine content of 13 percent by weight) and 200 parts by weight of cyclohexylamine are ground with 650 parts by weight of gravel for 65 hours. The mixture is washed through a coarse (60 mesh) sieve with ethanol to remove the gravel, filtered, washed thoroughly with ethanol and acetone, and dried.

The pigment composition so produced has high flocculation-resistance, and high tinctorial power in surface-coating compositions.

For the purpose of comparison, a similar experiment is conducted, but replacing the chloromethylated copper phthalocyanine with the same amount of crude monochloro copper phthalocyanine. In this case, a pigment composition is obtained of lower tinctorial power and poor flocculation-resistance on the same surface-coating media.

Phthalocyanine pigments of improved flocculation-resistance are also obtained when cyclohexylamine in the procedure given in the first paragraph of the above Example is replaced by β-ethanolamine, piperidine, 2-ethyl-hexylamine, benzylamine, di-n-butylamine, di-β-ethanolamine, γ-methoxy propylamine, ethylene diamine or tetraethylene pentamine. (Examples 2 to 10).

EXAMPLE 11

18 Parts by weight of dry crude monochloro copper phthalocyanine, 2.0 parts by weight of chloromethylated copper phthalocyanine (having a chlorine content of 10 percent by weight), 100 parts by weight of n-butylamine and 100 parts by weight of water are ground with 650 parts by weight of gravel for 65 hours. The mixture is washed through a coarse (60 mesh) sieve with water to remove the gravel, filtered, washed thoroughly with water and dried.

The pigment composition thus produced has a higher flocculation-resistance in surface-coating compositions compared with a similar pigment composition produced according to a similar procedure, but replacing the chloromethylated copper phthalocyanine by the same amount of monochloro copper phthalocyanine.

Very similar, but rather better results are achieved when Example 11 is repeated using ethanol, acetone or pyridine instead of water as diluent.

EXAMPLE 12

18 Parts by weight of dry crude monochloro copper phthalocyanine, 2 parts by weight of chloromethylated copper phthalocyanine (having a chlorine content of 18 percent), 200 parts by volume of n-butylamine and 600 parts by weight of glass beads are charged into a Drais Perl mill and milled at low speed for 6 hours. The mixture is then washed through a coarse (60 mesh) sieve with water to remove glass beads. The pigment composition is then filtered, washed thoroughly with water and dried.

The pigment composition so obtained has a high tinctorial power and is highly resistant to flocculation in surface-coating compositions.

EXAMPLE 13

18 Parts by weight of dry crude unchlorinated copper phthalocyanine, 2 parts by weight of chloromethylated copper phthalocyanine (having a chlorine content of 15 percent), 200 parts by weight of cyclohexylamine and 650 parts by weight of gravel are subjected to the same procedure as that described in Example 1.

The pigment composition so produced has high flocculation-resistance and high tinctorial power in surface-coating compositions.

EXAMPLES 14 AND 15

18 Parts by weight of dry crude metal-free phthalocyanine, 2 parts by weight of chloromethylated copper phthalocyanine (having a chlorine content of 15.1 percent by weight) and 200 parts by weight of n-butylamine are ground with 650 parts by weight of gravel for 65 hours. The mixture is washed through a coarse (60 mesh) sieve with water to remove the gravel, filtered, washed with water and dried.

The pigment composition so produced has high flocculation-resistance and high tinctorial power in surface-coating compositions.

For the purpose of comparison, a similar experiment is carried out but replacing the chloromethylated copper phthalocyaning with the same amount of crude metal-free phthalocyanine. In this case, a pigment composition is obtained of lower tinctorial power and poor flocculation-resistance on the same surface-coating composition.

A pigment having similar good properties is obtained when in the procedure given in the first paragraph of this Example the metal-free phthalocyanine is replaced by crude nickel phthalocyanine. (Example 15)

What we claim is:

1. A process for the production of a flocculation resistant pigment composition comprising contacting and milling a liquid grind comprising a phthalocyanine pigment having the tendency to flocculate with a minor proportion of a chloromethylated phthalocyanine pigment and an amine having the formula:

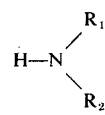

wherein $R_1$ represents hydrogen, an alkyl or hydroxyalkyl radical and $R_2$ represents an alkyl, hydroxyalkyl, alkoxy-alkyl, aminoalkyl, cycloalkyl or aralkyl radical, or $R_1$ and $R_2$ together with the nitrogen atom to which they are bound represent a heterocyclic radical.

2. A process as claimed in claim 1 wherein $R_1$ and $R_2$ together with the nitrogen atom to which they are bound represent a heterocyclic radical containing a further oxygen or nitrogen atom as ring member.

3. A process as claimed in claim 1 wherein the flocculating phthalocyanine is a mono-chloro copper phthalocyanine.

4. A process as claimed in claim 1 wherein the chloromethylated copper phthalocyanine contains from 10 to 30 percent weight, based on the weight of the phthalocyanine residue, of chlorine indirectly linked to the phthalocyanine nucleus through —$CH_2$ links.

5. A process as claimed in claim 1 wherein the proportion of the chloromethylated phthalocyanine to that of the flocculating phthalocyanine is from 1 to 15 percent by weight, based on the weight of the flocculating pigment.

6. A process as claimed in claim 1 wherein in the amine of formula I $R_1$ is hydrogen and $R_2$ is an alkyl radical having from one to 20 carbon atoms.

7. A process as claimed in claim 6 wherein in the amine of the formula I, $R_1$ is hydrogen and $R_2$ is n-butyl.

8. A process as claimed in claim 1 wherein in the amine of formula I $R_1$ and $R_2$ are each an alkyl radical having from one to six carbon atoms.

9. A process as claimed in claim 1 wherein the flocculating phthalocyanine is in crude form.

10. A process as claimed in claim 1 wherein the amine is employed in an amount in excess over the stoichiometric proportion required to fully react with the chloromethylated phthalocyanine.

11. A process as claimed in claim 1 wherein the process is effected in the presence of a diluting agent and at a temperature within the range of from 15° to 30° C.

12. A process as claimed in claim 11 wherein the diluting agent is an aliphatic alcohol or ketone.

13. A process as claimed in claim 1 wherein the flocculating phthalocyanine is copper phthalocyanine containing from 0 to 10 percent chlorine.

14. A process as claimed in claim 1 wherein the flocculating phthalocyanine is a metal-free phthalocyanine.

* * * * *